US007890439B2

(12) United States Patent
Hamadi

(10) Patent No.: US 7,890,439 B2
(45) Date of Patent: Feb. 15, 2011

(54) TUNING OF PROBLEM SOLVERS

(75) Inventor: Youssef Hamadi, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 750 days.

(21) Appl. No.: 11/611,654

(22) Filed: Dec. 15, 2006

(65) Prior Publication Data

US 2008/0147573 A1    Jun. 19, 2008

(51) Int. Cl.
G06E 1/00 (2006.01)
G06E 3/00 (2006.01)
(52) U.S. Cl. .............................. 706/19; 706/17; 706/12
(58) Field of Classification Search .................. None
See application file for complete search history.

(56) References Cited

U.S. PATENT DOCUMENTS

| 5,546,594 A | 8/1996 | Wazumi |
| 5,940,817 A | 8/1999 | Kishi et al. |
| 7,089,220 B2 | 8/2006 | Fromherz et al. |
| 7,089,221 B2 | 8/2006 | Fromherz et al. |

OTHER PUBLICATIONS

Ringwelski et al., Georg, "Boosting Distributed Constraint Satisfaction", 2005.*
Mammen, Dorothy, "Sharing and Interpreting Partial Results in Distributed Problem-Solving Systems", 1995.*
Mammen et al., "A Testbed for the Evaluation of Multi-Agent Communication and Problem-Solving Strategies", 1997.*
Mammen et al., "Problem Structure and Subproblem Sharing in Multi-Agent Systems", 1997.*
Lau et al., "A Multi-Agent Approach for Solving Optimization Problems involving Expensive Resources", Mar. 2005.*
Davin et al., "Impact of Problem Centralization in Distributed Constraint Optimization Algorithms", Jul. 2005.*
Flener et al., Pierre, "A Meta-heuristic for Subset Problems", 2001.*
Hoos, H.H. "An Adaptive Noise Mechanism for WalkSAT", In Proc of AAAI-02, pp. 656-660, 2002.
Hutter, F. at al., "Parameter Adjustment Based on Performance Prediction: Towards an Instance-Aware Problem Solver", Techinical Report MSR-TR-2005-125 Microsoft Research, Cambridge, UK, Dec. 2005.
Hutter, F. et al., "Performance Prediction and Automated Tuning of Randomised and Parametric Algorithms", Prinicples & Practice of Constraint Programming (CP-06), p. 213-228, 2006.

(Continued)

Primary Examiner—Donald Sparks
Assistant Examiner—Adrian L Kennedy
(74) Attorney, Agent, or Firm—Lee & Hayes, PLLC

(57) ABSTRACT

It is difficult to select parameter values for constraint programming problem solvers which will yield good performance. Automated tuning of such problem solvers on a per problem instance basis may be used and this involves learning a function for predicting the runtime of a problem solver depending on parameter values of the problem solver and features of the problem instance being solved. However, it takes time for such prediction functions to be learnt, either during operation of a problem solver or offline, using specified examples. To address this, information about such a prediction function is shared between two or more problem solvers to improve performance. A sharing system may be used to receive prediction function information and send this to problem solvers.

16 Claims, 10 Drawing Sheets

OTHER PUBLICATIONS

ILOG "Optimization Decision Management System", retrieved on Dec. 14, 2006 at <<http://www.ilog.com/products/optimization/tools/index.cfm>>, 3 pages.

ILOG "Overview", retrieved on Dec. 14, 2006 at <<http://www.ilog.com/products/optimization/overview.cfm>>, 3 pages.

ILOG "Understanding Optimization", retrieved on Dec. 14, 2006 at <<http://www.ilog.com/products/optimization/understanding/index.cfm>>, 2 pages.

Leyton-Brown, K. et al., "Learing the Empirical Hardness of Optimization Problems: The Case of Combinatorial Auctions", In Proc of CP-02, 2002.

Nudelman, E. et al., "Understanding Random SAT: Beyond the Clauses-to-Variables Ratio", In Proc of CP-04, 2004.

Patterson, D. J. et al., "Auto-WalkSAT: A Self-Tuning Implementation of Walksat" In Electronic Notes in Discrete Mathematics (ENDM), 9, 2001.

* cited by examiner

TUNING OF PROBLEM SOLVERS

TECHNICAL FIELD

This description relates generally to automated problem solvers. It is particularly related to, but in no way limited to, problem solvers for planning, scheduling, and/or configuration problems which use constraint-programming based optimization techniques.

BACKGROUND

Problem solvers which use constraint programming techniques to provide solutions to planning, scheduling and configuration problems are known and are currently commercially available. For example, the constraint programming engines provided by Ilog, Inc. These types of problem solvers are used to help organizations make better plans and schedules. For example, to plan production at a manufacturing plant, plan workforce schedules, plan truck loading, set routes for delivering goods or services, deciding when to release seats or hotel nights at a lower price, determining a optimal number of trades to bring a stock index fund back into compliance and many other applications.

Constraint programming techniques involve stating relations between variables in the form of constraints. A problem may be stated as a number of unknown variables comprising a state of the world. The problem solver searches for possible solutions to the problem by searching for values for all the variables. A large number of constraints are specified (for example, there may be tens of thousands of constraints over thousands of variables). The constraints are embedded in a host programming language of any suitable type. For example, a logic programming language such as Prolog or by using a separate library in conjunction with an imperative programming language such as C++ or Java (trade mark). The hog solver (trade mark) mentioned above is an example of such a C++ library for constraint programming.

One of the characteristics of such problem solvers is a high runtime variance. That is, the time taken to solve a given problem instance is difficult to predict (even for different problems of the same size, or for different instances drawn from the same distribution of instances of a problem type). This is a problem in many applications where it is necessary to ensure that a solution is found before reaching a specified time limit.

Previously this problem has been addressed by carrying out extensive tuning or trials of the problem solver on known training data to select a set of control parameters to be used in the problem solver. However, this is time consuming, complex and may result in relatively poor performance. The selected control parameters are a compromise between many possible choices and if the training data is not representative the selected parameters may not be appropriate when new, previously unseen data is presented to the problem solver.

It is required to provide improved automated methods and apparatus for selecting such control parameters.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

It is difficult to select parameter values for constraint programming problem solvers which will yield good performance. Automated tuning of such problem solvers on a per problem instance basis may be used and this involves learning a function for predicting the runtime of a problem solver depending on parameter values of the problem solver and features of the problem instance being solved. However, it takes time for such prediction functions to be learnt, either during operation of a problem solver or offline, using specified examples. To address this, information about such a prediction function is shared between two or more problem solvers to improve performance. A sharing system may be used to receive prediction function information and send this to problem solvers.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a constraint-programming problem solver, the system described is provided as an example and not a limitation. As those skilled in the art will appreciate, the present examples are suitable for application in a variety of different types of optimization systems.

It is required to provide automated approaches to select control parameters for use in problem solvers. Previous work has addressed the problem of selecting which of many algorithms with fixed parameters to use for a particular problem. For example, Leyton-Brown et al. describe building an empirical hardness model which predicts an algorithm's runtime given a problem instance in "Learning the Empirical Hardness of Optimization Problems: The case of combinatorial auctions" by Kevin Leyton-Brown, Eugene Nudelman and Yoav Shoham Proc. of CP-02, 2002. Such empirical hardness models can be used for algorithm selection by choosing the algorithm with the lowest predicted runtime. In contrast, another problem is with selecting parameters for a problem solver (that uses the same algorithm) on a per-instance basis; that is, selecting the parameter values each time a particular problem instance is received.

Machine learning techniques may be used to learn a function for predicting the runtime (or other measure of empirical hardness of the problem) given control parameters for the problem solver and also given input structural information about instances. For example, the prediction function can be expressed as:

$$f(x_i, c) \rightarrow t$$

where t is the predicted runtime, c are the control parameters for the problem solver, and $x_i$ is input structural information on a problem instance i.

Using this function it is then possible to select control parameters for the problem solver which give the shortest runtime. As more problem instances are solved by the problem solver the prediction function becomes better defined. In this way the selection of the control parameters and hence the performance of the problem solver improves over time. Such a prediction function may be used to achieve an instance—specific parameter tuning for a search algorithm which can significantly outperform its best default configuration. A default configuration comprises parameter settings selected by an operator to give good average performance. It typically represents a compromise which is shown theoretically in advance to be acceptable for many applications.

Figure 1:
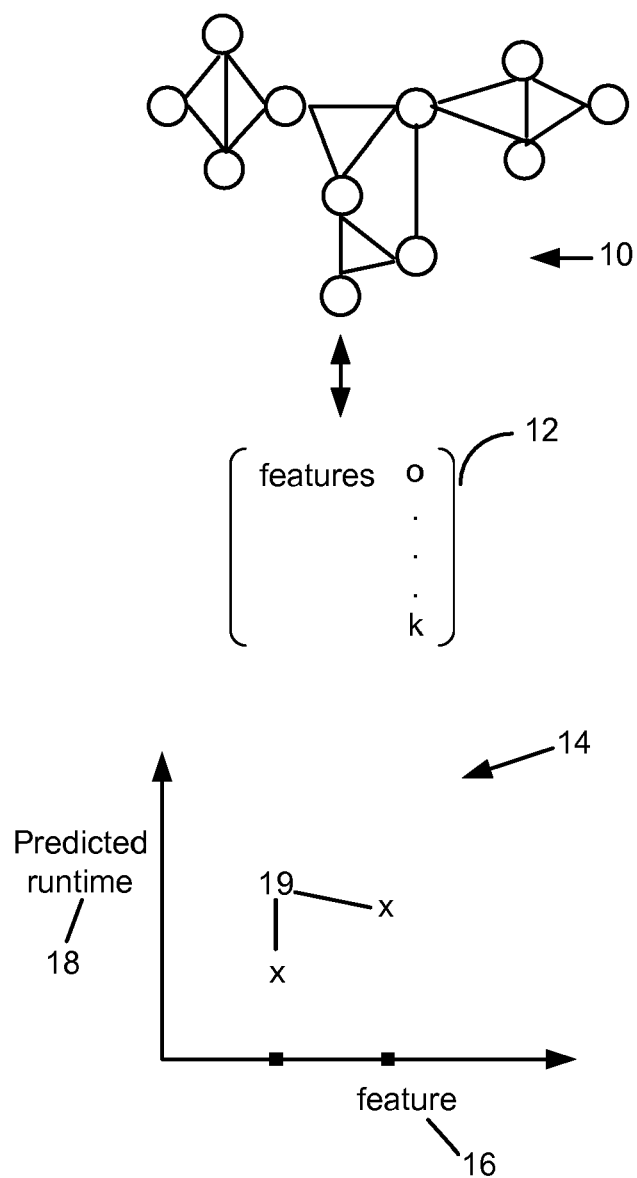
FIG. 1 illustrates a problem P represented by a problem solver using a graphical encoding and also shows a prediction function associated with the problem solver.

FIG. 1 illustrates a problem instance represented by a problem solver using a graphical encoding 10 and also shows a prediction function 14 associated with the problem solver. Suppose that a problem is represented by a problem solver using nodes connected via edges as illustrated schematically in FIG. 1. Many more nodes and edges may be used than those illustrated. The graphical encoding is characterized by a plurality of features 12 referenced as o through k in FIG. 1. These features are for example, the number of nodes in the graphical encoding, the number of edges in the graphical encoding, the average number of edges per node, the number of edges in the graphical encoding divided by the number of edges in a complete graph with the same number of nodes, and any other such features relating to the nodes and/or edges; and any combinations of such features. The graphical encoding may be presented as follows: nodes represent variables; and hyper-arcs (also referred to as edges) represent constraints between sub-sets of variables and/or binary constraints.

For different problem instances the values of the features may differ. For example, the problem solver may be used to solve problems from a single uniform problem domain. Alternatively, the problem solver faces problem instances with significant differences. These differences may either be due to the use of the solver as a general problem solving tool across different groups, or it may be due to changes that occur in the problem modeling.

As mentioned above, machine learning techniques are used to estimate a prediction function for predicting the runtime of the problem solver (or other indication of the empirical hardness of the problem) given the control parameters. This is illustrated in FIG. 1 as a graph 14 of a particular feature against predicted runtime. FIG. 1 only represents one feature in the graph 14 for clarity although in practice the prediction function is multi-dimensional with one dimension for each feature. As the problem solver is used to find solutions to particular instances of the problem, a machine learning system is able to gain more knowledge of the prediction function.

In embodiments described herein sharing of information between such machine learning systems associated with separate problem solvers is enabled.

Figure 2:
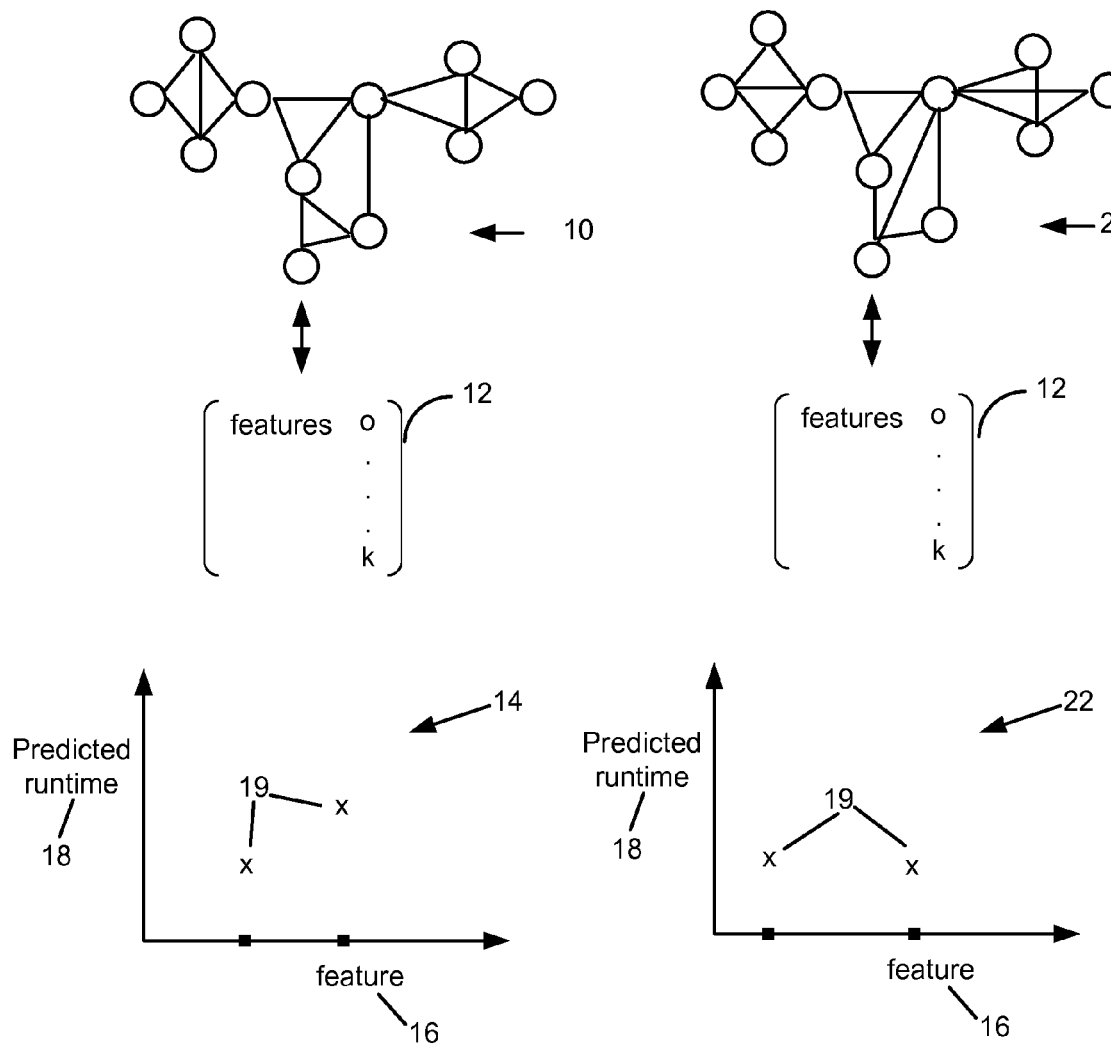
FIG. 2 illustrates two problems represented by two problem solvers.
Figure 3:
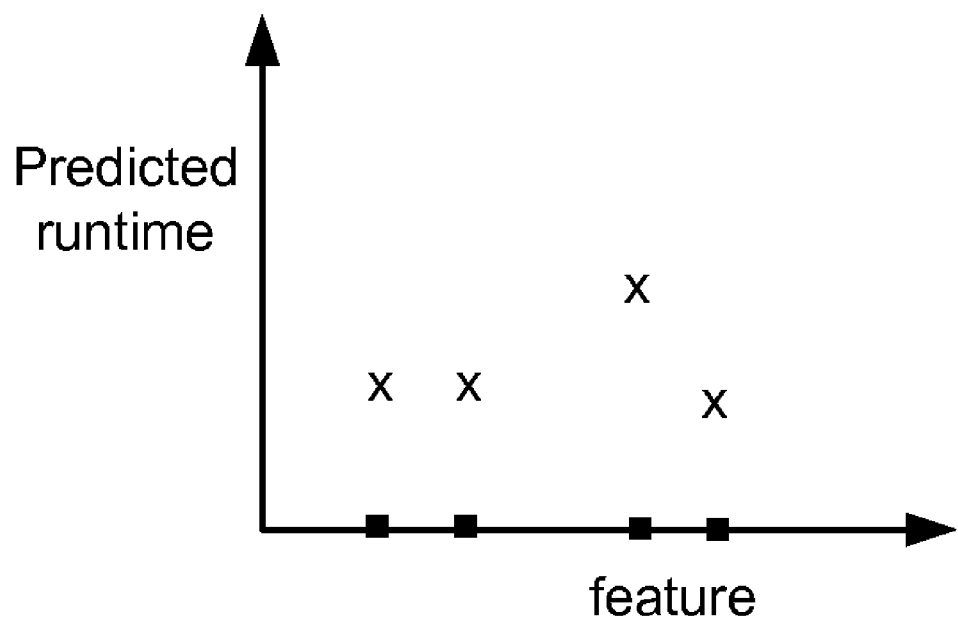
FIG. 3 illustrates a prediction function.

FIG. 2 illustrates two problems 10, 20 represented by separate problem solvers (not shown). For each problem, a separate machine learning system estimates or learns a prediction function 14, 22 as described above. It is recognized that if the problem solvers being used are compatible or the same it is possible to share information about the prediction functions 14, 22. This enables one or both of the problem solvers to make more accurate predictions and hence selection of control parameters. In this way, better problem solving performance is achieved. FIG. 3 shows the learnt prediction function of one of the solvers after sharing of information from the other solver. More information about feature—runtime pairs is known as illustrated. Thus the points shown in the graph in FIG. 3 comprise the four points from each of the graphs in FIG. 2.

Figure 4:
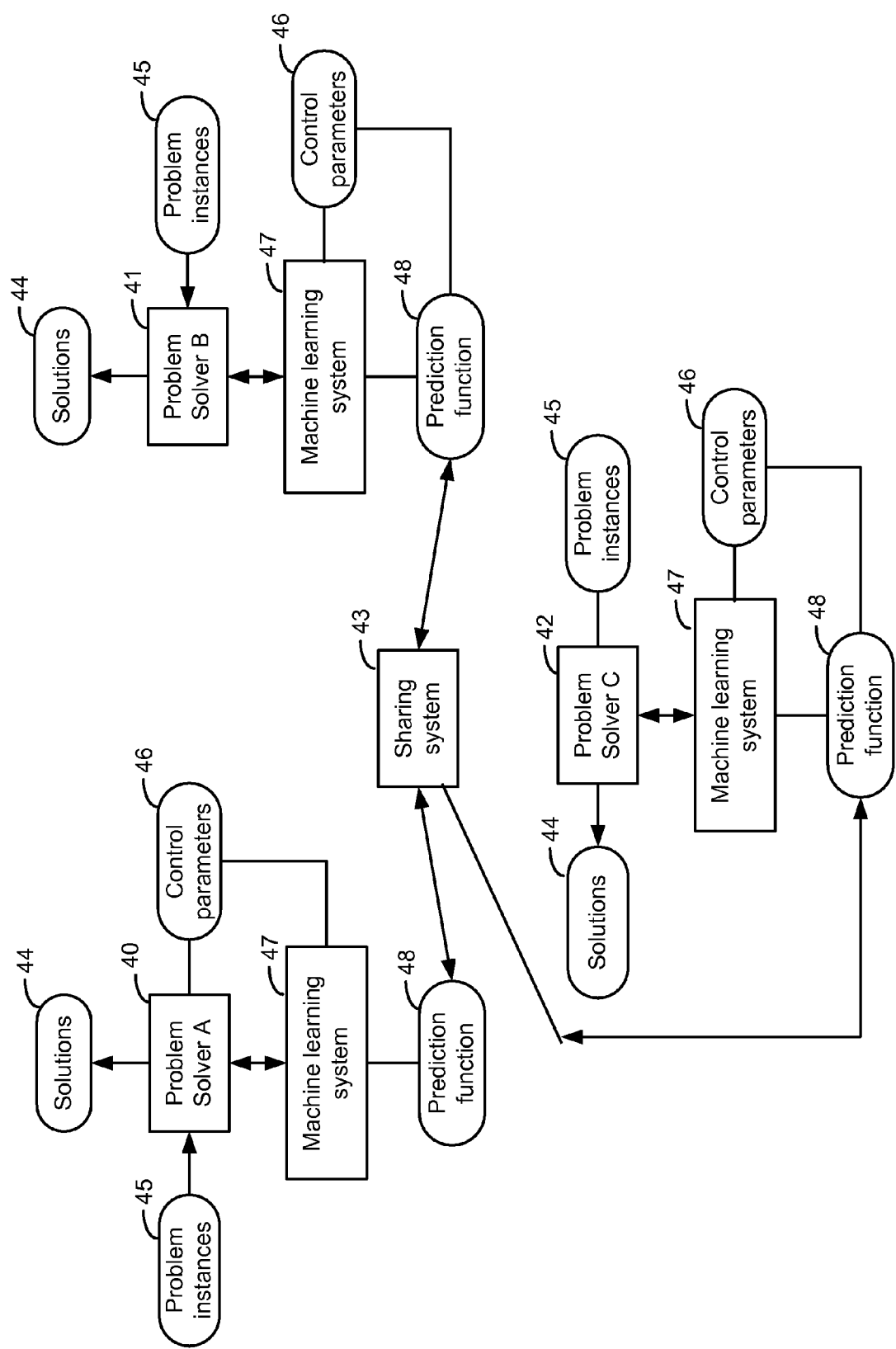
FIG. 4 shows three problem solvers in communication via a sharing system.

FIG. 4 shows a sharing system for sharing prediction function information between two or more problem solvers. In this example, three problem solvers A, B, C (40, 41, 42) are shown although larger numbers of problem solvers may be used. Each problem solver is illustrated as being associated with a machine learning system 47. The machine learning systems may be integral with the problem solvers or separate and in communication with the respective problem solvers. The problem solvers and machine learning systems are provided using processors of any suitable type such as computers. Software, firmware or equivalent instructions are provided on the processors to enable the functions of the problem solvers and machine learning systems to be carried out. Any suitable platform or operating system software may be used as known in the art to support execution of software for implementing the problem solver and machine learning functionality. The problem solvers each have one or more inputs arranged to receive problem instances 45 and control parameters 46. These inputs are of any suitable form such as a graphical user interface, internet connection, disk drive or other input. The problem solvers each have one or more outputs arranged to output solutions 44 to problem instances. These outputs are of any suitable type such as a graphical user interface, internet connection, disk drive or other output. The machine learning systems are arranged to receive and provide information to their associated problem solvers and are arranged to output prediction function information 48.

The prediction function information may be shared between the machine learning systems and/or problem solvers using the sharing system 43. The sharing system may be provided using any communications link between the machine learning systems 47. The sharing system may be passive and simply enable the machine learning systems 47 to broadcast their respective prediction function information for example. Alternatively, the sharing system may have an active role, polling the machine learning systems for new information that may be shared or actively obtaining this information in any suitable manner. In this case, the sharing system may comprise a processing node arranged to manage sharing of prediction function information between the machine learning systems 47.

The process of sharing the prediction function information may be continuous, may be a single event or may be carried out repeatedly at regular or irregular intervals. In addition, the sharing may be of the complete prediction function information, part of this information, or may comprise an update (difference between previous shared information sent).

Figure 5:
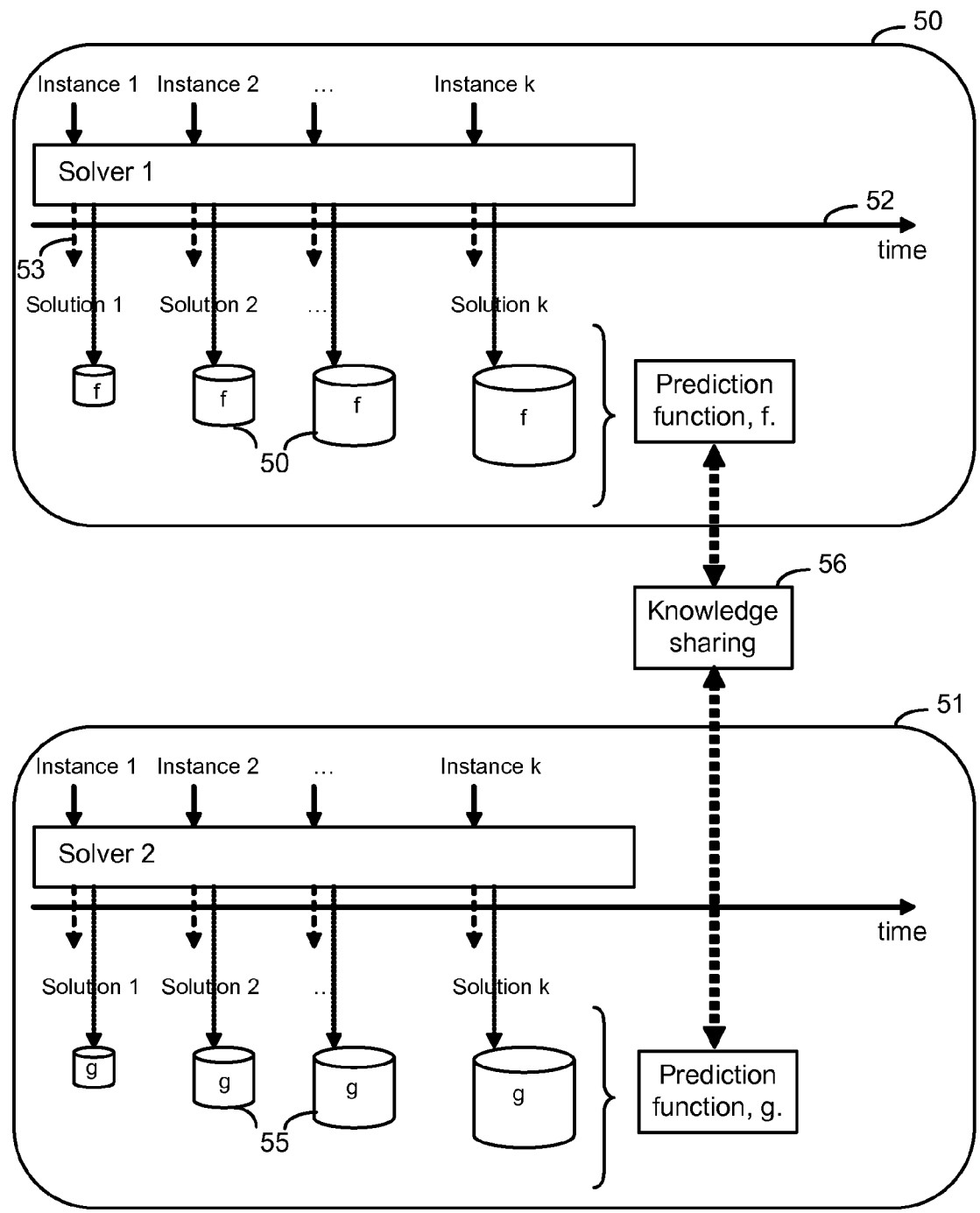
FIG. 5 is a schematic diagram of two problem solvers using knowledge sharing of prediction functions.

FIG. 5 is a schematic diagram of two problem solvers, Solver 1 and Solver 2, and illustrates knowledge sharing between prediction functions f and g associated with those respective solvers.

The upper part of FIG. 5 indicated by reference numeral 50 is associated with Solver 1. Time is represented by arrow 52 and over time a plurality of problem instances 1 to k are illustrated as being received at Solver 1. A solution is produced for each problem instance and these solutions are indicated by dashed arrows 53 labeled solution 1 through solution k. The machine learning system 47 (FIG. 4) associated with Solver 1 (not illustrated in FIG. 5) learns prediction function f and its knowledge of this prediction function increases over time as more problem instances are received. This is illustrated by the increasing size of the cylinders 54 in FIG. 5.

Solver 2 illustrated in the lower half of FIG. 5 and indicated by reference numeral 51 also takes in problem instances over time and a prediction function g is learnt as illustrated. Prediction functions f and g may be different especially if the problem instances received at the two Solvers are different and/or if the algorithms used at the two solvers are different. If Solver 1 and Solver 2 are compatible, for example, by being the same, or in that they behave similarly with similar parameter settings, then knowledge sharing may take place 56 between prediction functions f and g of the respective Solvers. This enables each solver to make more accurate prediction and eventually to reach better performances.

In a particular example, the prediction functions are defined locally at each solver as a table where each line has the following form: (feature 1, feature 2, ... feature n, parameter 1, parameter 2, ..., parameter m; runtime). Each line provides for each combination of features and each combination of control parameters a predicted runtime (or other measure of empirical hardness). The process of sharing the prediction function information then comprises exchanging these tables or parts of these tables between solvers. Alternatively, rather than exchanging information, information from one table is transferred to another such table without any reciprocal action.

However, it is not essential to use a table format. Any other suitable format for representing the prediction function information may be used.

Figure 6:
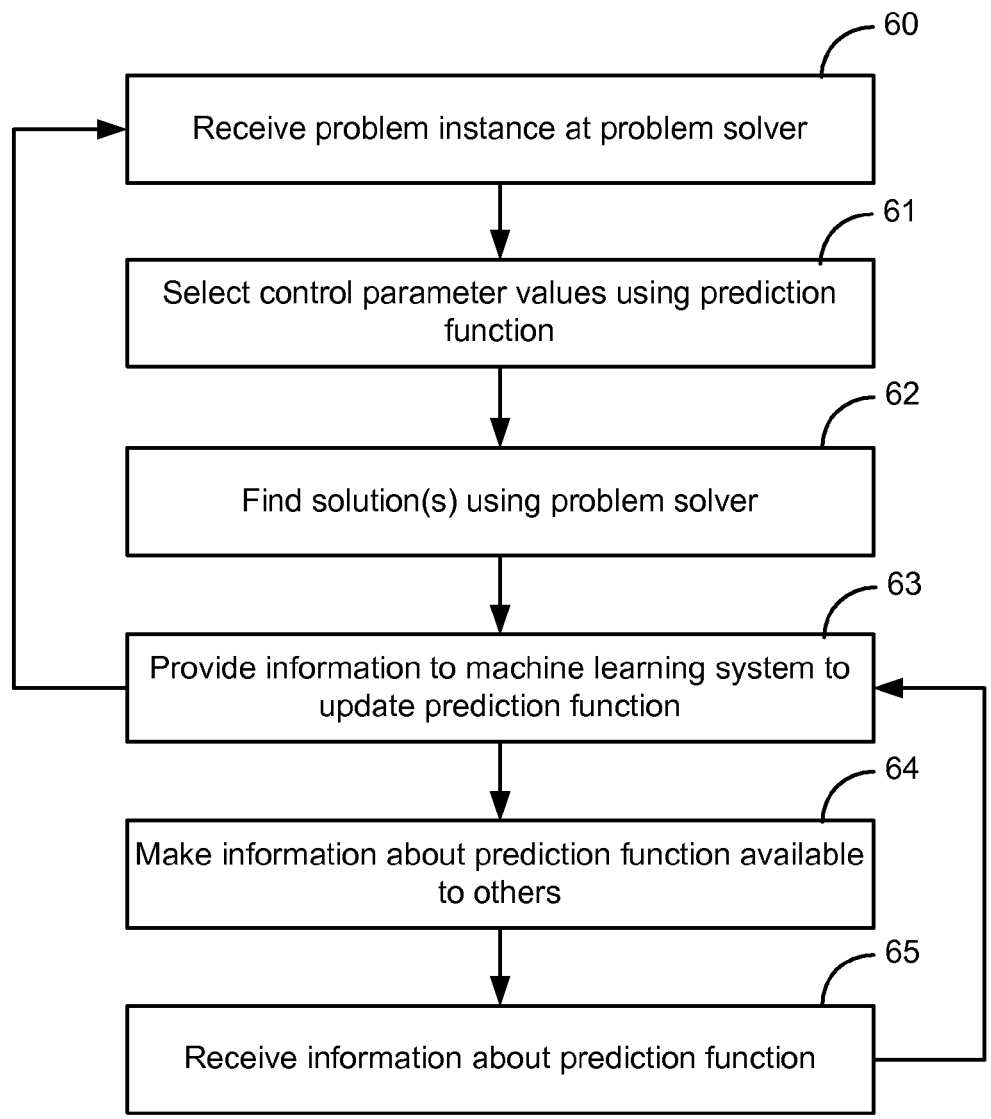
FIG. 6 is a flow diagram of a method of using a problem solver to share information about a prediction function.

FIG. 6 is a flow diagram of a method of improving performance of a problem solver using a prediction function. As described above, the prediction function predicts a measure of empirical hardness of a problem instance (such as runtime) given one or more control parameters for the problem solver and problem instance information such as the features mentioned above. A problem instance is received 60 at the problem solver. Control parameter values are selected using the prediction function 61 and one or more solutions are found using the problem solver 62. Information about the process of finding those solutions is then provided to a machine learning system to update the prediction function (see box 63). For example, this information might be the length of time taken by the problem solver to find the solution(s) and/or information about the quality of the solutions. If a new problem instance is received, the process then repeats, returning to box 60. Also, information about the prediction function may be made available to others, such as other problem solvers (box 64). It is also possible for the present problem solver to receive information from others (box 65) and use this to update the prediction function (box 63).

Figure 7:
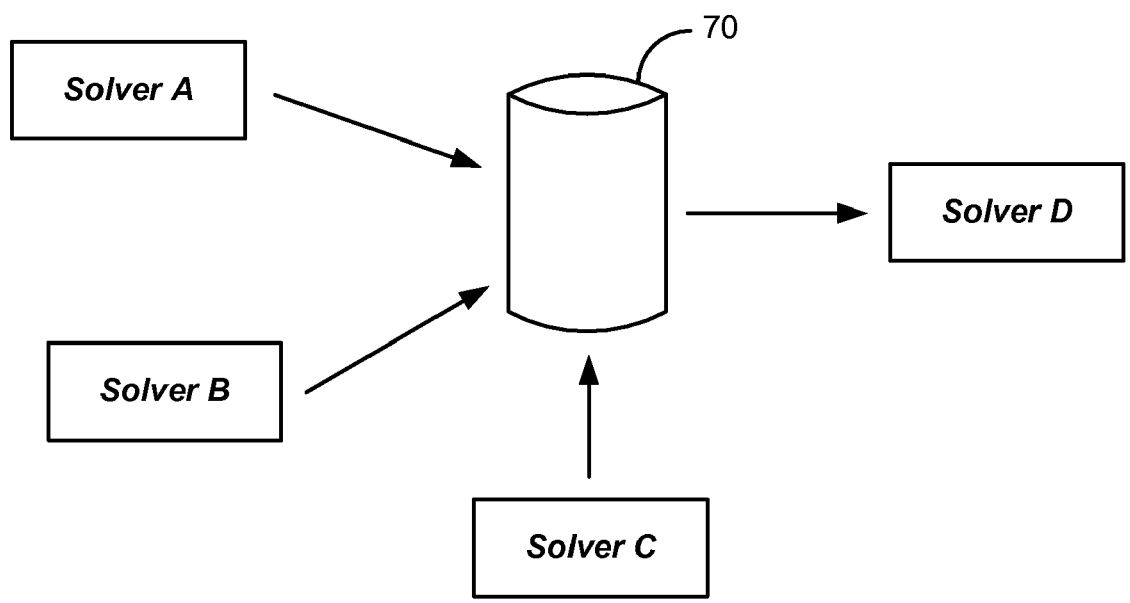
FIG. 7 is a schematic diagram of a plurality of problem solvers and a database.

FIG. 7 is a schematic diagram of a plurality of problem solvers A to D using the same algorithm or compatible algorithms. Solvers A, B and C may be actively finding solutions to problem instances and communicate information about their prediction functions to a database 70. That database collates or combines the information from the Solvers A to C and uses that to form a new prediction function which is supplied to Solver D. In this way a new solver D is formed which has enhanced performance over Solvers A, B and C.

More detail about the process of learning the prediction function is now given. As mentioned above the prediction function can be expressed as:

$$f(x_i, c) \to t$$

where t is the predicted runtime, c are the control parameters for the problem solver, and $x_i$ is input structural information on a problem instance i. Where there are many parameters and/or where the parameters are continuous it is difficult to learn the prediction function. This is achieved herein using machine learning techniques comprising regression such as linear regression, ridge regression or any other suitable type of regression.

Figure 8:
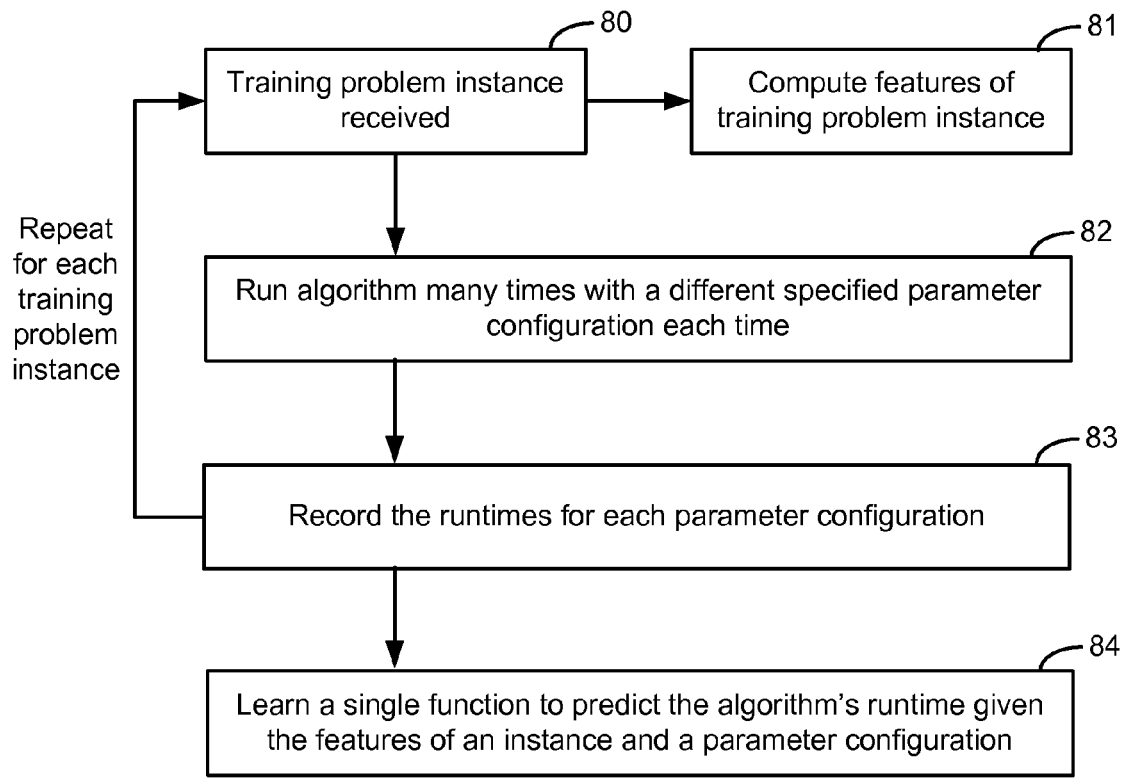
FIG. 8 is a flow diagram of a method of learning a prediction function during a training phase.

During a training phase (see FIG. 8) a first training problem instance is received 80 at the problem solver with integrated machine learning component. Features are computed for this training problem instance 81 as mentioned above. The algorithm of the problem solver is run 82 many times (the exact number of times may be specified by an operator) with different specified parameter configurations each time (the parameter configurations may be specified by an operator). The runtimes are recorded 83 for each parameter configuration. This process is then repeated for each training problem instance. Using the computed feature information and the associated recorded runtimes a single function is learnt 84 to predict the algorithms runtime. This prediction function predicts the runtime given the features of an instance and a parameter configuration.

The training phase may be carried out offline or may be carried out on-the-fly. It is also possible to use a combination of offline and on-the-fly training.

In the case that training is carried out offline (also referred to as a priori training) a plurality of problem instances are obtained in advance and used to train the problem solver before it is used during a test phase. This typically requires a large number of problem instances to be obtained in advance in order to achieve learning of the prediction function adequately. If the problem instances are difficult to obtain in advance it is hard to achieve good offline training. Also, if the problem instances used during the test phase are significantly different from the problem instances used during offline training, then performance is reduced.

In the case of online training, also referred to as on-the-fly training, the problem solver is initially configured using default parameters. These are selected by an operator in order to give good average performance. During the test phase a problem instance is received and this is used, not only to compute potential solutions, but also to enable learning of the prediction function. As more problem instances are received incremental learning of the prediction function occurs on-the-fly. Thus in this situation, the training and test phases overlap.

It is also possible to use any suitable combination of online and offline training. Using online training it is not necessary to obtain a large number of problem instances in advance and which are representative of problems in the test phase. Also, using online training, learning may be continual such that it is possible to adapt to changes in the problem instances being received.

Figure 9:
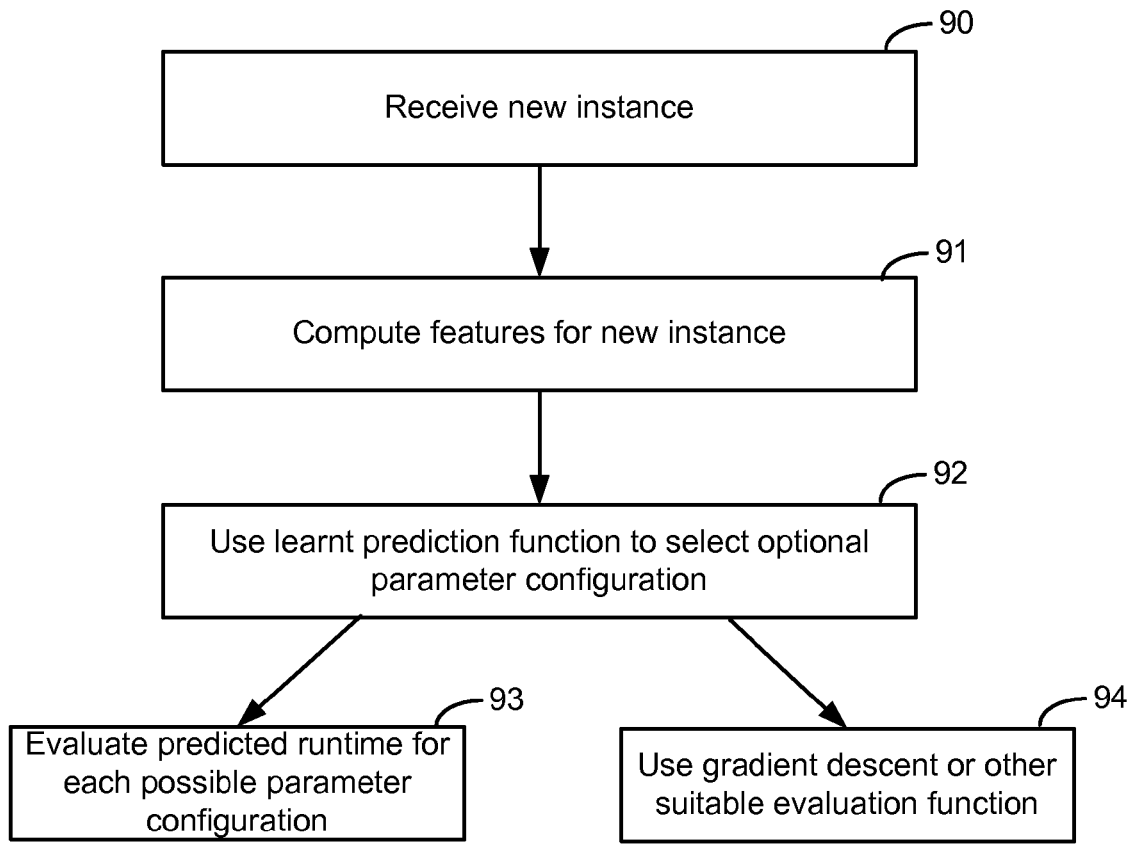
FIG. 9 is a flow diagram of a method of tuning parameters of a problem solver during a test phase.

During a test phase (see FIG. 9) a new problem instance 90 is received. Features are computed for the new instance 91 and the learnt prediction function (from the training phase) is used to select an optimal parameter configuration 92. For example, the predicted runtime is evaluated for each possible parameter configuration (box 93). In the case that this is not practical, gradient descent or other suitable evaluation functions are used to select the optimal parameter configuration from the learnt prediction function.

As mentioned above the process of learning the prediction function comprises using machine learning techniques comprising regression such as linear regression, ridge regression, or Bayesian linear regression. Information about these types of regression is now given.

One Machine Learning technique called linear regression restricts the learned predictive functions $f(\cdot)$ to be linear:

$$f_w(x_n) = w_o + \sum_{k=1}^{K} w_k x_{nk},$$

where $w=[w_0, \ldots, w_K]^T$ are free parameters of the function and the function's dependence on these parameters is made explicit by the subindex w. Note that $f_w(\cdot)$ is linear in both the features $x_n$ and the parameters w. This very simple model may not be flexible enough to do accurate predictions since linear functions of the features are not very expressive. However, the beauty of linear regression is that it doesn't actually require the target function to be linear in the features—all that it requires is linearity in the parameters w. Hence, it is possible to introduce a vector of so-called basis functions $\Phi=[\phi_1, \ldots, \phi_D]$ which can include arbitrarily complex functions of all features $x_n$ of an instance $s_n$. The linear regression model is then formulated as $$f_w(x_n) = w_o + \sum_{d=0}^{D} w_d \phi_d(x_n).$$

Note that the simple case of linear functions of the features is just a special case of this general formulation: here, the number of basis functions D equals the number of features K, and the dth basis function just picks the dth feature: $\phi_d(x_n) = x_{nd}$. Also note that the parameter w0 is not multiplied by a basis function. It serves as an offset (or bias) parameter that is implicitly multiplied by a "dummy" feature that is constantly 1. If a constant basis function is introduced $\phi_0=1$, it is possible to write the linear regression model more compactly as $$f_w(x_n) = \sum_{d=0}^{D} w_d \phi_d(x_n) = w^T \phi(x_n),$$

where $\phi(x_n)=[\phi_0(x_n), \ldots \phi_D(x_n)]^T$. Remember, that in the context of empirical hardness models it is required that the function $f_w^A(x_n)$ be a good predictor for the runtime $r_n^A$ of algorithm A on problem instance $s_n$. This is achieved by fitting the free parameters w such that $f_w^A(x_n) \approx r_n^A$ for all instances $s_n$ in the training set. More precisely, w is set such as to minimize some loss-function. The standard choice for this is mean squared prediction error (MSPE) on the training set:

$$\mathrm{loss}_{ls}(w) = \frac{1}{N} \sum_{n=1}^{N} (f_w^a(x_n) - r_n^A)^2, \quad (1)$$

where the index $l_s$ stands for least squares. The minimization of this function can be performed analytically as follows, leading to the globally optimal parameter vector $w_{ls}$. Taking the gradient of $\mathrm{loss}_{ls}(w)$ with respect to w and equating to zero yields the equation $$\sum_{n=1}^{N} r_n^A \phi(x_n)^T - w^T \left( \sum_{n=1}^{N} \phi(x_n) \phi(x_n)^T \right) = 0.$$

Solving this for w directly yields the so-called normal equations for the least squares problem:

$$w_{ls} = (\Phi^T \Phi)^{-1} \Phi^T r^A, \quad (2)$$

where $r^A = [r_1^A, \ldots, r_N^A]^T$ and having stacked the D+1 basis functions for all N training instances into the so-called design matrix $\Phi$:

$$\Phi = \begin{bmatrix} \phi(x_1)^T \\ \vdots \\ \phi(x_N)^T \end{bmatrix}.$$

Thus, after some algebra, finding the parameter vector $w_{ls}$ of a linear model that minimizes MSPE on the training set comes down to evaluating the term $w_{ls}=(\Phi^T\Phi)^{-1}\Phi^T r^A$ (which can be implemented in 1 line of Matlab code). This process is also referred to as training the linear model. The computational complexity of this training procedure is very small: it is dominated by the cost of multiplying the D×N matrix $\Phi^T$ by the N×D matrix $\Phi$ (which will take time $O(D^2 N)$) and by the inversion of the D×D matrix $\Phi^T\Phi$ (which will take time $O(D^3)$). When reporting results, it is often convenient to report the square root of MSPE; this is called the root mean squared (prediction) error, RMSE.

At test time, A's runtime on a yet unseen problem instance $s_{N+1}$ can be predicted by simply evaluating the learned function $f_w^A(\cdot)$ at the features $x_{N+1}$ of the new instance. Since $f_w^A(x_{N+1})=w^T\Phi(x_{N+1})$, this evaluation simply computes the inner product of two (D+1)-dimensional vectors, which takes time O(D).

One problem of standard linear least squares regression is that $w_{ls}$ may contain excessively large weights. These large weights are the results of fitting some of the noise in the training data (also referred to as overfitting) and will lead to poor generalization on new unseen test data. This problem can be easily dealt with by minimizing an alternative loss function $$\mathrm{loss}_{ridge}(w) = \frac{1}{N} \sum_{n=1}^{N} (f_w^A(x_n) - A_n)^2 + \lambda w^T w, \quad (3)$$

which penalizes large parameter values by adding a regularization term $\lambda w^T w$. Conveniently, the global optimum of this modified loss function can still be found analytically. This is done in what is called ridge regression. In direct analogy to the standard result for linear regression, setting the gradient of $\text{loss}_{ridge}(w)$ to zero and solving for w leads to the ridge solution $$w_{ridge}(\lambda I + \Phi^T \Phi)^{-1} \Phi^T A, \quad (4)$$

where I denotes the (D+1)-dimensional identity matrix. Note that $w_{ridge}$ is almost identical to $w_{ls}$, with the only difference that $w_{ridge}$ adds a constant $\lambda$ to the diagonal of $\Phi^T \Phi$ before inverting it. Another frequently used motivation for adding a small constant $\lambda$ to the diagonal of the matrix is that there are otherwise numerical problems with the inversion. In practice, the performance of ridge regression depends strongly on the actual value of $\lambda$, with too low values leading to overfitting (like in standard linear regression) and too large values leading to overly flat functions that are not flexible enough to fit the data. Thus, in practice, the regularization parameter $\lambda$ must be carefully chosen via cross-validation.

In a particular embodiment the training and test phases are implemented as follows.

A single function $g_w(\cdot,\cdot)$ is learnt that has c in its argument list. Given the set of features $x_n$ of an instance $s_n$ and a parameter configuration c, $g(x_n,c)$ will yield a prediction of $r_n^c$, A[c]'s runtime on instance $s_n$. The main advantage of this approach is that it can generalize to yet unseen parameter configurations as well as to yet unseen instances. The details of this approach are as follows.

In the training phase, for each training instance $s_n$ A is run with a set of parameter configurations $c_n = \{c_{n,1}, \ldots, c_{n,k_n}\}$ and the corresponding runtimes $r_n = \{r_{n,1}, \ldots, r_{n,k_n}\}^T$ are collected. Also computed are $s_n$'s features $x_n$. Now the parameter configuration is treated similarly to the features. A new set of basis functions (still called $\phi$) is defined whose domain now consists of the cross product of features and parameter configurations. For each instance $s_n$ and parameter configurations $c_{n,j}$, there is a row in the design matrix that contains $\phi(x_n,c_{n,j})^T$ that is, the design matrix now contains $n_k$ rows for every training instance. The target vector $r = [r_1^T, \ldots, r_N^T]^T$ just stacks all the runtimes on top of each other.

A single function $g(\cdot,\cdot)$ is then learnt to predict A's runtime given the features of an instance and a parameter setting c. Once more, this comes down to the application of Equation (4) given above in order to learn a parameter vector w. The final function has the form $g_w(x_n,c) = w^T \phi(x_n,c)$. The test phase for this approach is as follows. Given a new instance $s_{N+1}$, one computes its instance features $x_{N+1}$ as usual, but in order to predict a runtime by evaluating function $g_w(x_{N+1},c)$ one needs a parameter configuration c. The aim at test time is to find the optimal parameter configuration c* for the new test instance, that is, the parameter configuration that minimizes expected runtime. If the number of possible parameter configurations is small, one can just evaluate $g_w(x_{N+1}, p)$ for every configuration. For a larger number of configurations, more complicated methods need to be applied, such as gradient descent for continuous parameters. It is important to note, though, that the evaluation function for this search is still very cheap: since it only consists of an inner product of two (D+1)-dimensional vectors, it only takes time O(D). In particular, algorithm A does not have to be executed at all during the course of this search.

In another embodiment Bayesian learning techniques are used. Bayesian linear regression leads to the exact same mean prediction as ridge regression. That is, Bayesian linear regression (when using a prior with mean zero and diagonal covariance matrix) leads to a predictive distribution for runtime that is centered on the runtime prediction of ridge regression, but also provides an estimate of the uncertainty for this prediction. This uncertainty information is useful for many purposes. For example, the prediction is used when the predictive variance is low and discarded when the variance is too high. The uncertainty information may be used to select runtime predictions for use in any suitable manner. Also, the predictive variance may be used to decide which training instances to use.

Bayesian linear regression techniques are described in more detail in "Pattern Recognition and machine Learning" by Christopher M. Bishop 2006, ISBN 978-0-387-31073-2.

Figure 10:
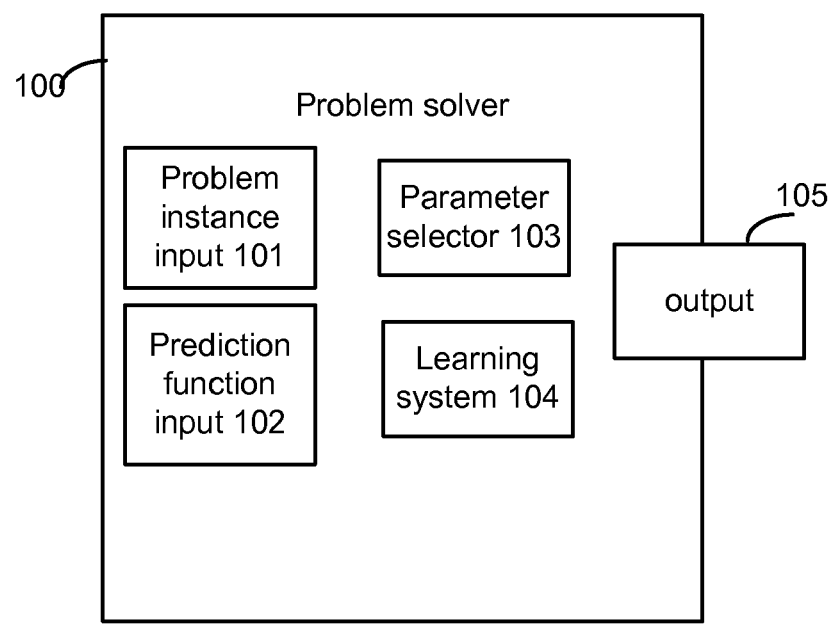
FIG. 10 is a schematic diagram of a problem solver.

FIG. 10 is a schematic diagram of an example problem solver 100. The problem solver is implemented using a computer or processor of any suitable type. It comprises an input 101 arranged to receive information about problem instances. This input is of any suitable type such as a USB connection, an Ethernet connection, a disk drive, a file input, a graphical user interface, an internet connection or any other suitable input. An input 102 arranged to receive information about a learnt prediction function is also provided. This input may be integral with or separate from the other input and is of any suitable type as mentioned above. The problem solver 100 comprises an output 105 for providing information about potential solutions that are identified. This output is of any suitable type such as a graphical user interface, display screen, file store, memory device, USB connection, Ethernet connection, disk drive, or any other suitable output.

The problem solver also comprises a parameter selector 103 which provides the function of selecting parameter values for use by the problem solver as mentioned herein. In addition, a learning system 104 is provided which enables the prediction function to be learnt either online, offline or using a combination of online and offline learning.

Although the present examples are described and illustrated herein as being implemented for configuring algorithm parameters in advance of carrying out a search for a problem solution, the system described is provided as an example and not a limitation. As those skilled in the art will appreciate, the present examples are suitable for application in methods and systems for reactively tuning; that is, tuning algorithm parameters or selecting algorithms during a search for a problem solution.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method at a first constraint programming problem solver comprising:
   receiving information about a problem instance for which a potential solution is sought;
   computing features of the problem instance, the features comprising at least one of: a variable, a constraint between a sub-set of variables, or a binary constraint;
   receiving information about a prediction function configured to predict a runtime to find the potential solution to the problem instance from a second constraint programming problem solver, separate from the first constraint programming problem solver, the prediction function having been learned at the second constraint programming problem solver using machine learning techniques comprising at least one of: linear regression, ridge regression, or Bayesian linear regression;
   selecting parameter values for use by the first constraint programming problem solver on the basis of at least the computed features and the received information about the prediction function; and
   confirming that the first and second constraint programming problem solvers are compatible with one another.

2. A method as claimed in claim 1 which comprises receiving information about a prediction function from a plurality of other constraint programming problem solvers.

3. A method as claimed in claim 1 which further comprises confirming that the first and second constraint programming problem solvers use the same algorithms.

4. A method as claimed in claim 1 wherein the prediction function is further configured to predict an indication of difficulty for a constraint programming problem solver to find a solution to a given problem instance depending on parameter values for the constraint programming problem solver and features of the problem instance.

5. A method as claimed in claim 1 which comprises receiving information about a prediction function comprising, information about feature values of a problem instance, associated parameter values and an observed indication of difficulty for a constraint programming problem solver to find a solution given those feature values and parameter values.

6. A method as claimed in claim 1 which further comprises:
   implementing a training phase, the training phase being implemented offline, on-the-fly, or by a combination of offline and on-the-fly techniques comprising:
      using the constraint programming problem solver, with the selected parameter values, to find a solution to the problem instance;
      observing an indication of difficulty for the constraint programming problem solver to find the solution;
      updating the information about the prediction function on the basis of the selected parameter values, computed features and observed indication; and
      repeating a user defined number of times: the using the constraint programming problem solver, the observing an indication of difficulty, and the updating the information about the prediction function; and
   sending the updated information to at least one other problem solver.

7. A method as claimed in claim 6 which comprises sending the updated information to a sharing system for sharing with at least one other problem solver.

8. A method at a first constraint programming problem solver comprising:
   receiving information about a problem instance for which potential solution is sought;
   computing features of the problem instance, the features comprising at least one of:
      a variable, a constraint between a sub-set of variables, or a binary constraint;
   selecting parameter values for use by the first constraint programming problem solver on the basis of at least the computed features and information about a prediction function;
   implementing a training phase, the training phase being implemented offline, on-the-fly, or by a combination of offline and on-the-fly techniques comprising:
      using the constraint programming problem solver, with the selected parameter values, to find a solution to the problem instance;
      observing an indication of difficulty for the constraint programming problem solver to find the solution;
      updating the information about the prediction function on the basis of the selected parameter values, computed features and observed indication; and
      repeating a user defined number of times: the using the constraint programming problem solver, the observing an indication of difficulty,
      and the updating the information about the prediction; and
   sending the updated information to at least one other problem solver confirming that the first constraint programming problem solver and a second constraint programming problem solver are compatible with one another.

9. A method as claimed in claim 8 which further comprises ensuring that the first and second constraint programming problem solvers use the same algorithms.

10. A method as claimed in claim 8 which further comprises receiving information about a prediction function from a second constraint programming problem solver, separate from the first constraint programming problem solver.

11. A method as claimed in claim 10 which further comprises confirming that the first and second constraint programming problem solvers use the same algorithms.

12. A method as claimed in claim 8 which further comprises:
calculating the prediction function using machine learning techniques comprising at least one of linear regression, ridge regression, or Bayesian linear regression.

13. One or more computer-readable storage media storing computer-executable instructions for a first constraint programming problem solver that, when executed, configures a processor to perform acts comprising:
receiving information about a problem instance for which a potential solution is sought;
computing features of the problem instance, the features comprising at least one of: a variable, a constraint between a sub-set of variables, or a binary constraint;
receiving information about a prediction function configured to predict a runtime to find the potential solution to the problem instance from a second constraint programming problem solver, separate from the first constraint programming problem solver, the prediction function having been learned at the second constraint programming problem solver using machine learning techniques comprising at least one of: linear regression, ridge regression, or Bayesian linear regression;
selecting parameter values for use by the first constraint programming problem solver on the basis of at least the computed features and the received information about the prediction function;
implementing a training phase, the training phase being implemented offline, on-the-fly, or by a combination of offline and on-the-fly techniques comprising:
using the constraint programming problem solver, with the selected parameter values, to find a solution to the problem instance;
observing an indication of difficulty for the constraint programming problem solver to find the solution;
updating the information about the prediction function on the basis of the selected parameter values, computed features and observed indication; and
repeating a user defined number of times: the using the constraint programming problem solver, the observing an indication of difficulty, and the updating the information about the prediction;
confirming that the first and second constraint programming problem solvers are compatible with one another; and
sending the updated information to at least one other problem solver.

14. The one or more computer-readable storage media of claim 13, further comprising:
receiving information about a prediction function from a plurality of other constraint programming problem solvers.

15. The one or more computer-readable storage media of claim 13, further comprising:
confirming that the first and second constraint programming problem solvers use the same algorithms.

16. The one or more computer-readable storage media of claim 13, further comprising:
sending the updated information to a sharing system for sharing with at least one other problem solver.

* * * * *